United States Patent [19]
Witters et al.

[11] Patent Number: 5,511,066
[45] Date of Patent: Apr. 23, 1996

[54] POLICING METHOD FOR POLICING AN AGGREGATE CELL STREAM OF FIRST AND SECOND PRIORITY CELLS

[75] Inventors: Johan H. Witters, Antwerp, Belgium; Johannes A. M. Van Tetering, Zevenbergen, Netherlands; Guido H. M. Petit, Antwerp, Belgium

[73] Assignee: Alcatel N.V., Rijswijk, Netherlands

[21] Appl. No.: 382,655

[22] Filed: Feb. 2, 1995

[30] Foreign Application Priority Data

Feb. 7, 1994 [EP] European Pat. Off. .............. 94200233

[51] Int. Cl.⁶ .................................................. H04J 3/14
[52] U.S. Cl. .............................. 370/17; 370/60; 370/94.1; 370/58.3
[58] Field of Search .......................... 370/17, 16, 13–14, 370/85.6, 111, 94.1, 60, 60.1, 54, 58.1, 58.2, 58.3, 61, 94.2; 340/825.06, 825.5, 825.51, 825.52

[56] References Cited

U.S. PATENT DOCUMENTS

| 5,253,247 | 10/1993 | Hirose et al. | 370/14 |
| 5,361,253 | 11/1994 | Feijen et al. | 370/17 |
| 5,394,408 | 2/1995 | Nishihara et al. | 370/14 |

FOREIGN PATENT DOCUMENTS

9311622  6/1993  WIPO .

OTHER PUBLICATIONS

"The Spacer-Controller: An Efficient UPC/NPC for ATM Networks", P. Boyer et al, *XIV International Switching Symposium*, Yokohama, Oct. 25–30, 1992, vol. 2, pp. 316–320.

"ATM Technology for Corporate Networks", P. Newman *IEEE Communications Magazine*, vol. 30, No. 4, Apr. 1992, pp. 90–101.

"The Spacing Policer, an Algorithm for Efficient Peak Bit Rate Control in ATM Networks", E. Wallmeier et al, *XIV Int'l Switching Symposium*, Yokohama, Oct. 25–30, 1992, pp. 22–26.

*Primary Examiner*—Alpus H. Hsu
*Assistant Examiner*—Ricky Ngo
*Attorney, Agent, or Firm*—Ware, Fressola, Van Der Sluys & Adolphson

[57] ABSTRACT

A policing method is proposed policing an aggregate ATM cell stream (IN) consisting of both high and low priority cells. The method consists in policing the aggregated stream as a whole whilst also policing separately a substream formed by the high priority cells as prescribed by ITU-TS recommendation I.371.

6 Claims, 1 Drawing Sheet

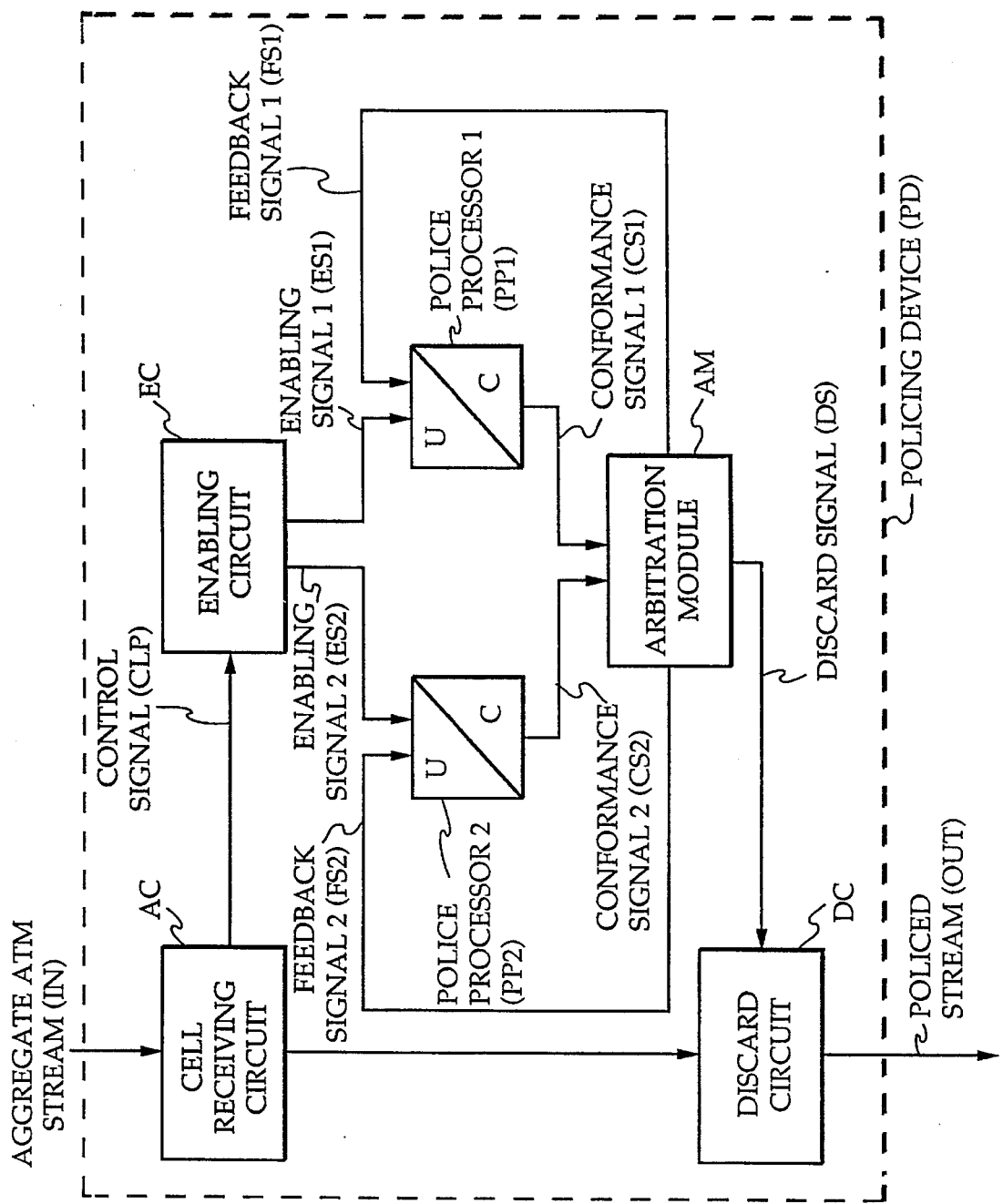

1

POLICING METHOD FOR POLICING AN AGGREGATE CELL STREAM OF FIRST AND SECOND PRIORITY CELLS

TECHNICAL FIELD

The present invention relates to communications methods and, more particularly, concerns a policing method for policing an aggregate cell stream of at least first and second cells, said method including at least a first policing step using at least one first parameter and checking if said first cells are satisfactory and a second policing step using at least one second parameter and checking if said first and second cells are satisfactory, said method thus deriving an output cell stream.

BACKGROUND OF THE INVENTION

Such a policing method is already known from the article "The Spacer-Controller: an efficient UPC/NPC for ATM networks", by P. Boyer et al., ISS 7992, October 7992, Vol. 2, paper A9.3, pp. 376–320. This known method is described in particular with reference to FIG. 3 of the article and relates to the policing of an aggregate Asynchronous Transfer Mode or ATM stream in which separate substreams of first and second cells with the first cells having a higher priority than the second cells is contained. The high priority first cells are characterized by a Cell Loss Priority CLP bit equal to 0 whereas the low priority second cells have a CLP bit equal to 1. For such an aggregate ATM cell stream the ITU-TS recommendation I.371 prescribes that the high priority first cells have to be policed separately while on the aggregate stream of both first and second cells should also be policed as a whole.

As described in the mentioned article the above prescribed two policing steps are performed sequentially such that already policed high priority first cells are forwarded to the second policing step together with the unpoliced low priority second cells.

A serious drawback of this known method is that a high priority first cell may still be discarded in the second policing step regardless of its priority or, in other words, that a high priority first cell satisfactory (or conforming) in the first step may thereafter still be discarded in the second step because of the presence of low priority second cells. Such a result is clearly contrary to the establishment of a separate high priority substream.

SUMMARY OF THE INVENTION

It is therefore an object of the present invention to provide a policing method of the above known type but that avoids discarding high priority first cells as a consequence of the presence of low priority second cells while remaining in line with the above mentioned ITU-TS recommendation.

This object is achieved by virtue of the fact that when in said first policing step one of said first cells is satisfactory, it is inserted into said output stream and said first and second parameters updated, and that when in said second policing step one of said second cells is found to be satisfactory, it is inserted in said output stream and said second parameter updated.

In this way a first cell, in the above example a high priority first cell, is always inserted into the output cell stream when it satisfies the first policing step regardless of the presence of low priority second cells. This is in line with an intuitive understanding of the priority concept for cell streams. On the other hand, the effect of the high priority first cells being thus inserted in the output stream is taken into account in the second policing step by updating a second parameter used thereby also for such a high priority cell. Hence, it can still be said that the aggregate cell stream is policed as a whole, as prescribed by the mentioned ITU-TS recommendation.

This means in particular that when a high priority first cell that satisfies the first policing step but not the second one and hence causes the aggregate stream monitored in this second step to violate a negotiated characteristic, this cell is nevertheless passed to the policed stream. Without an above mentioned update of the second parameter for this cell, such a violation cannot be taken into account for a next cell of the aggregate stream and would distort the performance of the policing method. It is therefore clear that introducing this update of the second parameter for such a cell results in the local increase in the peak cell rate of the aggregate stream which results from the insertion of a high priority first cell as described above being eventually averaged out at the cost of low priority second cells. This is all the more acceptable since such local increases in the peak cell rate are inherent in the application of accepted algorithms.

A characteristic feature of the present invention is that said one first cell is discarded when in both said steps it is unsatisfactory and that it is changed to a said second cell and inserted into said output stream when only in said first policing step it is found to be unsatisfactory, and in that said one second cell is discarded when in said second policing step it is found to be unsatisfactory.

In this way an alternative solution brought forward in the mentioned draft CCITT recommendation, i.e. tagging of high priority first cells which do not satisfy in the first policing step is implemented while keeping the advantages of a method as described hereinabove.

Other characteristic features of the invention are that said first policing step consists in applying a first virtual scheduling algorithm to said first cells, while said second policing step consists in applying a second virtual scheduling algorithm to both said first and second cells of said aggregate stream, and in that said first and second algorithms are updated by updating first and second predicted arrival times constituting said first and second parameters respectively, and in that said second predicted arrival time is updated for a first cell satisfying said first but not satisfying said second algorithm by adding an aggregate inter-arrival time to a previous value of said second predicted arrival time.

In order to be able to apply the well known virtual scheduling algorithm, disclosed for instance in the mentioned article and to be regarded as the industry standard in this field, particularly the second algorithm needs to be adapted in the above way. Indeed, provision has to be made for an update of the second predicted arrival time even if a cell is unsatisfactory for the purposes of this second algorithm. By proceeding in the above way such a provision is implemented in the second algorithm in such a way that the latter cells are handled in a similar way to cells which are satisfactory because they are received within a predetermined tolerance time interval, a so called Cell Delay Variation tolerance γ.

It is to be noted that in this way high priority first cells that are inserted into the policed stream may give rise to distinct updates of the second predicted arrival time, namely dependent upon whether they are satisfactory or not in the second step and upon the way in which they are found to be satisfactory, i.e. by being received later than the predicted arrival time or by being received earlier than the latter time but within the above mentioned CDV tolerance.

DESCRIPTION OF THE SOLE FIGURE IN THE DRAWING

The above mentioned and other objects and features of the invention will become more apparent and the invention itself will be best understood by referring to the following description of an embodiment taken in conjunction with the accompanying drawing wherein a policing device PD is shown that is particularly well suited for implementing a policing method according to the present invention.

DESCRIPTION OF THE BEST MODE OF THE INVENTION

The policing device PD shown is more particularly the subject of our co-pending European patent application EP 94200231.2 of even date and entitled "Policing Device", from which U.S. patent application Ser. No. 08/382,654, now pending, claims priority and is preferred for the implementation of the present policing method for the reasons stated therein. Therefore, the above co-pending application is incorporated herein by reference.

The policing device PD is for instance used at the input of a switching network (not shown) with the purpose of verifying and performing corrections if the characteristics of a cell stream which have been negotiated with a user at call set-up are respected by this user.

The policing device PD shown is more particularly used for the policing with respect to the peak cell rate of aggregate ATM streams including a high priority first cells characterized by a Cell Loss Priority or CLP bit equal to 0 and low priority second cells characterized by a CLP bit equal to 1. Such an aggregate stream IN is supplied to the policing device PD at a like named terminal thereof and the policing device PD generates therefrom a policed stream OUT appearing at its like named output terminal. The policed stream thus generated is such that both the aggregate policed stream as the policed substream constituted by high priority cells behave within characteristics negotiated therefor at connection set-up.

The policing device PD more particularly includes a cell receiver circuit AC which for each cell received by it generates a control signal CLP identifying the cell priority i.e. whether it is a low or a high priority cell. It applies this control signal CLP which is identical to the CLP bit of the received cell to a control input of an enabling circuit EC and also forwards this cell to a discard circuit DC. This circuit DC discards the cell from or inserts it in the policed stream OUT dependent on a discard signal DS generated by control circuitry EC, PP1, PP2 and AM which is described hereinbelow. The latter control circuitry EC, PP1, PP2 and AM thus actually enforces the negotiated characteristics for the stream IN, whereas the actual physical derivation of the policed stream OUT is left to the discard circuit DC on the basis of the Go/NoGo type discard signal DS generated by this control circuitry.

The control circuitry EC, PP1, PP2 and AM includes the mentioned enabling circuit EC which as a function of the above control signal CLP activates a first police processor PP1 or a second police processor PP2 by means of a first or a second enabling signal ES1 and ES2 respectively. The latter signals are applied to enabling inputs of these processors PP1 and PP2 respectively.

These police processors PP1 and PP2 implement an instance of a same Modified Virtual Scheduling Algorithm or MVSA which is described hereinbelow and can be considered as comprising an update part U and a conformance check part C, as schematically shown in the drawing. By activating one of these processors PP1/PP2 and hence by carrying out at a specific point in time the respective instances of the MVSA, a first/second conformance signal, CS1/CS2, is produced indicating whether a cell processed by the corresponding police processor PP1/PP2 satisfies (or conforms to) the characteristic to be enforced thereby.

These conformance signals CS1 and CS2 are supplied to an arbitration module AM which in response thereto derives the above discard signal DS as well as a first and a second feedback signal FS1 and FS2 and applies the latter signals to control inputs of PP1 and PP2 respectively. As will become clear later on, these feedback signals FS1 and FS2 indicate to their corresponding processors whether or not they have to update a parameter used in the corresponding instance of the MVSA according to a value that is prepared together with the generation of the conformance signals.

Before describing some applications of the present policing device PD, the above mentioned MVSA an instance of which is carried out by PP1 and PP2 is described in relative detail. This MVSA comprises the following code:

```
IF (PAT<TIME)
    THEN
        TEMP_PAT:=TIME+NIAT
        CS:=1
    ELSE
        IF (PAT>TIME+γ)
            THEN
                TEMP_PAT:=PAT+NIAT
                CS:=0
            ELSE
                TEMP_PAT:=PAT+NIAT
                CS:=1
```

Wherein, PAT is a predicted arrival time; TIME is an arrival time of the handled cell; TEMP_PAT is a prepared updated value of PAT; γ is a so called Cell Delay Variation tolerance; NIAT is a negotiated cell inter-arrival time; CS is a conformance value indicating whether or not the handled cell is conforming according to the applied instance of the MVSA.

The above MVSA is similar to the well known virtual scheduling algorithm and its operation is therefore not discussed in detail here, except for the modifications that are introduced therein. A first such modification is that the predicted arrival time is not updated directly but that only an update is prepared for it in an intermediate variable TEMP_PAT. Whether or not this update is effectively applied then depends upon a feedback value FS in the following way:

```
IF (FS=1)    THEN    PAT:=TEMP_PAT
             ELSE    PAT:=PAT
```

A second modification consists in the introduction of a new line allowing for the preparation of an update value even when an instance of the MVSA finds the handled cell to be unsatisfactory. The latter modification is needed in order to apply the policing methods corresponding to the present invention as will be seen later.

It is to be noted that the above MVSA may clearly be considered as being split up in a conformance check part C deriving the conformance signal CS and in an update part U preparing an updated value TEMP_PAT and carrying this update out or not. It is further to be noted that the processors PP1 and PP2 in carrying out an instance of the MVSA generate the resulting conformance values CS as conformance signals CS1 and CS2 respectively and that the feedback signals FS1 and FS2 issued by the arbitration module AM are used by the above instances of the MVSA as feedback value FS.

With the above description of the policing device PD in mind two implementations of a policing method according to the present invention are discussed in detail hereinbelow by defining the operation of the enabling circuit EC and the arbitration module AM for such a method.

The enabling circuit EC activates both processors PP1 and PP2 for the high priority cells and only the second processor PP2 for the low priority cells in accordance with the following table the value of the control signal CLP as already mentioned above denotes the priority of the actually handled cell:

| CLP | ES1 | ES2 |
| --- | --- | --- |
| 0 | 1 | 1 |
| 1 | 0 | 1 |

From this table it is clear that high priority cells are handled both by PP1 and PP2, while low priority cells are handled by PP2 solely. It may be verified that this is in line with the general meaning of the present version of the ITU-TS recommendation I.371 which prescribes that the ATM stream IN including both high and low priority cells should be policed as a whole while the substream formed by the high priority cells should also be policed separately.

In a first implementation of the method the arbitration module AM realizes the logical operations summarized in the following table. In this table CLP is included for clarity's sake; a value 1 for the conformance signals CS1 and CS2 indicates that the cell actually handled satisfies the corresponding instance; a value 1 for the discard signal DS indicates that the cell may be passed by DC; a value 1 for the feedback signals FS1 and FS2 indicates that a prepared update has to be carried out; and dis. indicates that the police processor corresponding to one of the signals CS1, CS2, FS1 and FS2 is disabled by EC.

| CLP | CS1 | CS2 | DS | FS1 | FS2 |
| --- | --- | --- | --- | --- | --- |
| 0 | 0 | 0 | 0 | 0 | 0 |
| 0 | 0 | 1 | 0 | 0 | 0 |
| 0 | 1 | 0 | 1 | 1 | 1 |
| 0 | 1 | 1 | 1 | 1 | 1 |
| 1 | dis. | 0 | 0 | dis. | 0 |
| 1 | dis. | 1 | 1 | dis. | 1 |

As may be verified from the third row of the above table, in this method a high priority cell satisfying the instance applied by the first processor PP1 handling the separate high priority substream, is always passed regardless of the result of the operation performed by the second processor PP2. However, for such a high priority cell both of the instances are updated, thus requiring the above mentioned extra line in the MVSA since an update for the instance implemented by PP2 has to be carried out also when PP2 finds this cell to be unsatisfactory.

It is clear that in so doing high priority first cells can no longer be discarded on account of low priority second cells. As a result that and when compared to prior art methods, a local increase in the peak cell rate may result. However, and also in view of the fact that such local peak cell rates in excess of the negotiated peak rate are inherent to the application of a virtual scheduling type algorithm, this increase is made negligible through the update of the second processor PP2. Indeed, the latter ensures that on average no violation of the negotiated characteristics for the aggregate stream IN results.

A second implementaion of the method is largely similar to the first one and consists in providing a tagging option. It may be easily verified that this is implemented by an arbitration module realizing the following table:

| CLP | CS1 | CS2 | DS | FS1 | FS2 |
| --- | --- | --- | --- | --- | --- |
| 0 | 0 | 0 | 0 | 0 | 0 |
| 0 | 0 | 1 | 1 | 0 | 1 |
| 0 | 1 | 0 | 1 | 1 | 1 |
| 0 | 1 | 1 | 1 | 1 | 1 |
| 1 | dis. | 0 | 0 | dis. | 0 |
| 1 | dis. | 1 | 1 | dis. | 1 |

As may be verified the tagging option is provided through adaptation of the second row of the table, wherein it can be seen that high priority cells which only satisfy (or conform to) the instance carried out by the second processor PP2 are inserted in the output stream OUT and give rise to an update of PP2. It is to be noted that in order to provide this tagging option some adaptations need to be made to the policing device hardware. Indeed, it has to be ensured that cells to be tagged are physically changed from high to low priority cells, i.e. their CLP bit needs to be changed from 0 to 1 prior to being inserted into the policed stream OUT. Such adaptation is not described herein in detail since it may be easily realized by a person of ordinary skill through proper adaptation of DS and DC.

While the principles of the invention have been described above in connection with specific apparatus, it is to be clearly understood that this description is made only by way of example and not as a limitation on the scope of the invention.

We claim:

1. Policing method for policing an aggregate input cell stream (IN) of at least first priority cells and second priority cells, said method comprising the steps of:

a first policing step (PP1) using at least one first predicted arrival time parameter for checking if said first priority cells are satisfactory, and if satisfactory, then inserting said one of said first prioritycells into an output cell stream (OUT) and updating said first and second predicted arrival time parameters, and a second policing step (PP2) using at least one second predicted arrival time parameter for checking if said first priority cells and said second priority cells are satisfactory, and if satisfactory, then inserting said one of said second priority cells in said output cell steam (OUT) and updating said second predicted arrival time parameter.

2. Policing method according to claim 1, wherein said one first priority cell is discarded when in said first step (PP1) it is found to be unsatisfactory and wherein said one second priority cell is discarded when in said second step (PP2) it is found to be unsatisfactory.

3. Policing method according to claim 1, wherein said one first priority cell is discarded when in both said first and second policing steps (PP1, PP2) it is unsatisfactory and that it is changed to a said second priority cell and inserted into said output cell stream (OUT) when only in said first policing step it is found to be unsatisfactory, and in that said one second priority cell is discarded when in said second policing step (PP2) it is found to be unsatisfactory.

4. Policing method according to claim 1, wherein said first policing step (PP1) comprises the step of applying a first virtual scheduling algorithm to said first priority cells, while said second policing step (PP2) comprises the step of applying a second virtual scheduling algorithm to both said first priority cells and said second priority cells of said aggregate stream (IN).

5. Policing method according to claim 4, wherein said first and second algorithms are updated by updating said first and second predicted arrival time parameters respectively, and wherein said second predicted arrival time parameter is updated for a first priority cell satisfying said first algorithm but not satisfying said second algorithm by adding an aggregate interarrival time to a previous value of said second predicted arrival time parameter.

6. Policing method according to claim 1, wherein said aggregate cell stream (IN) is an Asynchronous Transfer Mode cell stream.

* * * * *

UNITED STATES PATENT AND TRADEMARK OFFICE
CERTIFICATE OF CORRECTION

PATENT NO. : 5,511,066
DATED : April 23, 1996
INVENTOR(S) : Witters et al

It is certified that error appears in the above-indentified patent and that said Letters Patent is hereby corrected as shown below:

At column 6, line 43 (line 7 of claim 1), please change "prioritycelIs" to --priority cells--.

Abstract, item [57], line 6, please add new text as follows:

--The present policing method always inserts a high priority cell satisfying the last mentioned separate policing step into the output stream (OUT) regardless of the result of the first mentioned aggregate policing step. In order to keep a good performance for the method, the predicted arrival time used in this aggregate policing step is however also updated for such a high priority cell which does not conform to this aggregate policing step. The latter requires a modification of the known and commonly used Virtual Scheduling Algorithm.--

Signed and Sealed this

Tenth Day of September, 1996

*Attest:*

BRUCE LEHMAN

*Attesting Officer*  *Commissioner of Patents and Trademarks*